Sept. 23, 1941.  F. C. ROE  2,256,751
WATERING DEVICE
Filed Feb. 20, 1939
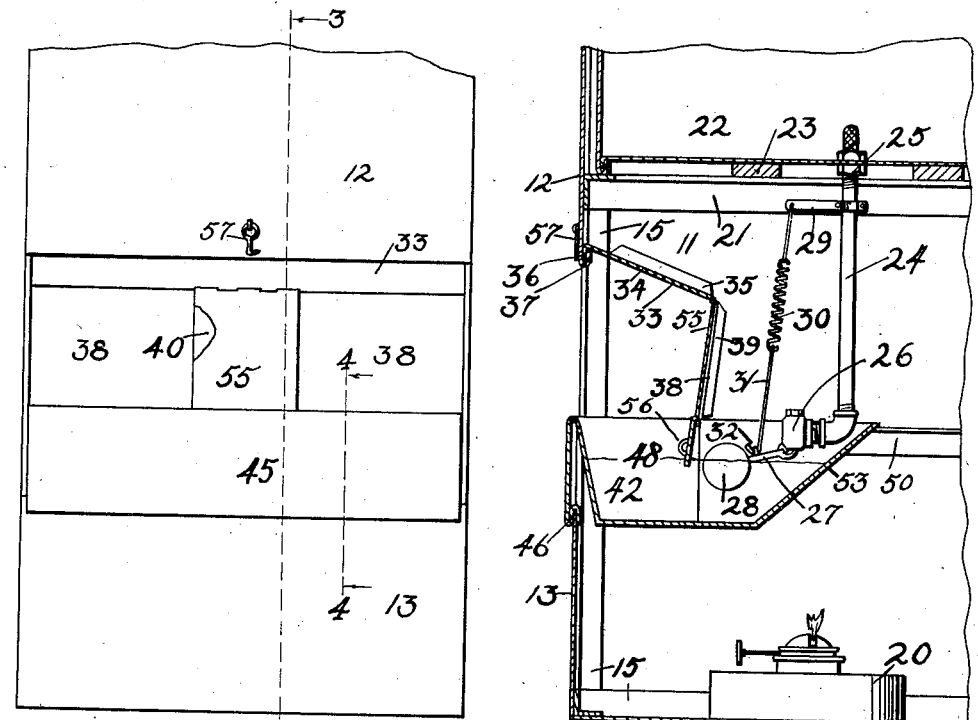
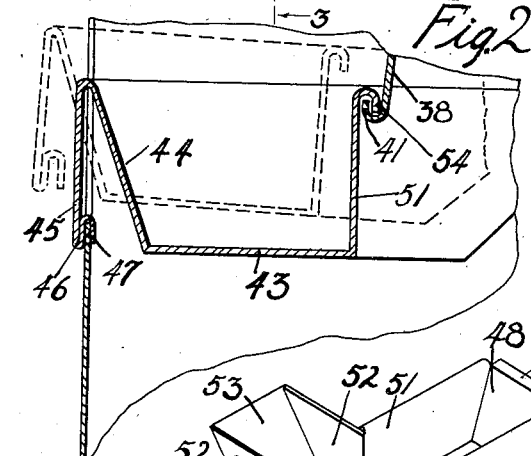
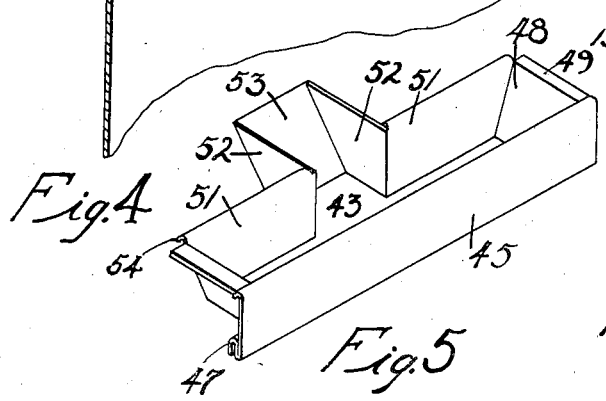
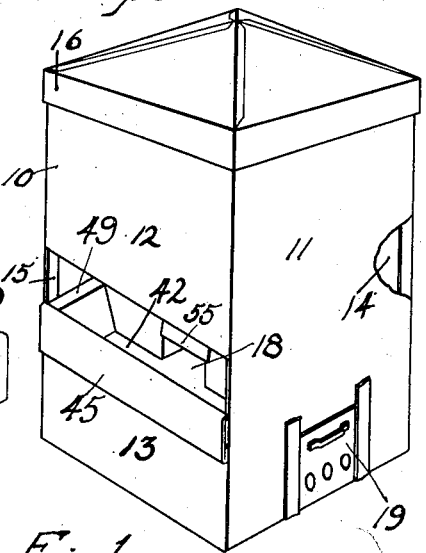
Inventor
Floyd C. Roe
by Onnig & Hague
Attys Patented Sept. 23, 1941

2,256,751

UNITED STATES PATENT OFFICE 2,256,751

WATERING DEVICE

Floyd C. Roe, Washington, Iowa

Application February 20, 1939, Serial No. 257,282

3 Claims. (Cl. 119—73)

This invention relates to improvements in watering troughs and means for heating the same to be used in connection with the care and feeding of domestic fowls, especially turkeys. It is desirable that the watering trough be cleaned out at frequent intervals.

It is the object of my invention to provide a drinking device of simple and inexpensive construction in which the trough may be readily, quickly and easily removed for cleaning purposes, returned, and in which the trough is fully enclosed and protected so that the water may be easily heated in cold weather and so that fowls cannot enter the trough.

More specifically, it is the object of my invention to provide a closed housing having a detachable water tank and a detachable trough wherein an opening is provided in the housing through which the fowls may have access to the water trough for drinking purposes, and to provide in connection therewith improved means whereby water will be automatically delivered to the trough by means of a suitable float control valve, and further provide improved means whereby the valve may be closed so that either the tank or the trough may be removed from the housing at the will of the operator without permitting water to flow from the tank.

In the accompanying drawing Figure 1 is a perspective view of my improved watering device.

Figure 2 is a front elevation of the lower portion of my improved waterer.

Figure 3 is a sectional view taken on the line 3—3 of Figure 2.

Figure 4 is an enlarged detail sectional view taken on the line 4—4 of Figure 2.

Figure 5 is a perspective view of the watering trough as removed from the housing.

The numeral 10 indicates generally the housing, which is preferably made of galvanized sheet metal and comprises side members 11 and front members 12 and 13, and a back member 14. The sides and front and back members are secured to a frame 15, preferably formed of angle iron. The housing is provided with a detachable cover 16 and a bottom plate 17, thus providing a closed housing with the exception of the space between the front members 12 and 13, to provide an opening 18. One of the side members 11 is provided with a door 19 through which a lamp 20 may be placed in the interior of the housing, said lamp 20 provides means for heating the trough and tank hereinafter to be described.

The frame member 15 is provided with horizontal frame members 21 which are designed to support a water tank 22, said water tank having braces 23 for supporting the bottom of the tank, the ends of the braces resting on the angles 21.

Fixed in the bottom of the tank 22 I have provided a vertical pipe 24 having lock nuts 25 at its upper end for fixing it into said tank, the lower end of the pipe 24 being provided with a valve casing 26, said casing being adapted to support the ordinary float control valve which is controlled by means of a float arm 27 and a float 28.

Fixed to the upper end of the pipe 24 is a bracket 29 to which one end of a spring 30 is connected, the other end of the spring being provided with a hook 31 adapted to enter a loop 32 formed in the float arm 27, thus providing means whereby the float arm 27 may be held in a closed position so that when it is desired to remove the tank 22 from the housing the operator may do so without permitting the water from the tank to escape, by simply placing the hook portion of the member 31 in the loop 32, the said hook being removed at such times as the water trough is in an operative position.

I have provided within the housing a partition 33 comprising a downwardly and inwardly extending portion 34 and extending between the side members 11 and fixed thereto by means of upwardly extending flange 35 either by riveting or spot welding, the forward edge of the member 34 being provided with a downwardly extending flange 36 hooked into a groove formed by an upwardly extending flange 37 from the lower end of the member 12. The inner end of the member 34 terminates in a downwardly extending portion 38 which is provided with flanges 39 secured to the members 11. The central portion of the member 38 is provided with an opening 40, the lower end of the member 38 having upturned flanges 41 to form hooks for supporting the back side of the trough 42, said trough being formed of a single piece of sheet metal and having a bottom 43 and an upwardly and outwardly inclined front portion 44 the upper edge of which terminates in a downwardly extending apron 45, the lower edge of which terminates in an upwardly extending flange 46 and a downwardly extending flange 47 to form a hook adapted to be supported on the upper edge of the member 13, the trough having end members 48, the upper edges of which terminate in flanges 49 adapted to rest on angle irons 50 carried by the members 15.

The back of the trough comprises vertical portions 51 having their inner ends terminating in rearwardly extending side members 52 of an extension portion of the trough for receiving the float 28, said extension portion having an inclined back 53. The upper edges of the back members 51 are provided with downwardly extending flanges 54 to provide hooks to rest on the flanges 41 of the member 38, and thus provide means for detachably supporting the rear end of the trough with the extension portion extending rearwardly through the opening 40 for receiving the float 28.

For closing the opening 40 I have provided a door 55 hinged to the inner end of the plate 34 and having its lower end extending within the trough 42 in the manner clearly illustrated in Figure 3. The lower end of the door 55 has a loop 56 designed to receive a hook 57 for latching the door in an elevated or open position so that the operator may have access to the hook 31 through the openings 18 and 40. By this arrangement it will be seen that the trough 42 may be easily removed for cleaning purposes when desired, by simply latching the door 55 to its elevated position, then latching the float 28 to its closed position, after which the forward edge of the tank 42 may be elevated slightly to release the hook portions 47 from the upper edge of the member 13. The forward ends may be further elevated to permit the rear end of the member 53 to be swung downwardly about the flanges 41 as fulcrums, after which the entire trough may be then elevated slightly to release the members 54 from the members 41, as illustrated in dotted lines in Figure 4, after which the trough may then be easily removed.

Thus it will be seen I have provided a watering device of comparatively simple construction in which the trough is supported in a suitably tight housing and in which is included a lamp for heating the trough during cold weather and in which either the trough or the tank may be easily and quickly removed from the housing when so desired and in which the fowls have easy access to the trough for drinking purposes and in which the trough is located within the housing in such a manner that the fowls cannot enter the trough, the partition members 33 and 38 providing means for sealing the interior of the housing to prevent the escape of heat.

I claim as my invention:

1. In a watering device, the combination of a closed housing having an opening in one side, a partition comprising an inwardly extending portion from the upper edge of said opening having its inner end terminating in a downwardly extending portion, a watering trough adapted to be placed through said opening and to be supported beneath the lower edge of said partition, means for hooking the back edge of said trough to the lower edge of said partition, and means for hooking the front edge of said trough to that portion of the housing forming the lower edge of said opening, a watering tank, and means for automatically delivering water to said trough from said tank.

2. In a watering device, the combination of a closed housing having an opening in one side, a water tank detachably supported therein, a partition having a portion extending inwardly from the top edge of said opening having its inner end terminating in a downwardly extending portion, the downwardly extending portion having a centrally located doorway, a watering trough adapted to be placed into said housing through said opening and supported beneath the lower edge of said partition, said trough having a rearwardly extending float compartment communicating therewith, means for detachably hooking the back edge of said trough to the lower edge of said partition, means for hooking the front edge of said trough to that portion of the housing forming the lower edge of said opening, a supply pipe carried by said water tank, a float valve supported by said pipe, a float closing said valve, said valve being supported in the rearwardly extending portion of said trough, and yieldable means carried by said tank for closing said float valve.

3. In a watering device, the combination of a closed housing having an opening in one side, a water tank detachably mounted in said housing, an outlet pipe depending from the bottom of said tank, a float control valve for said pipe, means carried by said tank for temporarily holding said valve in closed position, a water trough having its back side provided with a rearwardly and inwardly extending portion to receive the float of said valve when the trough is in operative position within said housing, said housing having a partition plate extending inwardly from the upper edge of said opening, the inner edge of said plate terminating in a downwardly extending portion, and means hooking the lower edge of said downwardly extending portion to the back edge of said trough and in front of its inwardly extending portion, the lower edge of the front side of said trough having a groove for receiving that portion of the housing forming the lower edge of said opening whereby the trough may be removed only after the front edge of the trough has been first elevated and the inner end of the inwardly extending portion of said trough lowered to free the lower end of the valve and float to permit the trough to be moved outwardly through said opening.

FLOYD C. ROE.